US008820465B2

(12) United States Patent
Ito et al.

(10) Patent No.: US 8,820,465 B2
(45) Date of Patent: Sep. 2, 2014

(54) FRONT FORK FOR A SADDLE RIDE VEHICLE, AND VEHICLE INCORPORATING SAME

(75) Inventors: Shinji Ito, Saitama (JP); Hiroaki Takashiba, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 389 days.

(21) Appl. No.: 13/103,186

(22) Filed: May 9, 2011

(65) Prior Publication Data

US 2011/0278084 A1 Nov. 17, 2011

(30) Foreign Application Priority Data

May 12, 2010 (JP) ................... 2010-110006

(51) Int. Cl.
*B62K 25/08* (2006.01)

(52) U.S. Cl.
CPC ..................................... *B26K 25/08* (2013.01)
USPC .......................................................... 180/276

(58) Field of Classification Search
CPC ........ B62K 25/08; B62K 25/24; B62K 21/02; B62K 21/20
USPC ................... 280/275, 276; 180/219
See application file for complete search history.

(56) References Cited

U.S. PATENT DOCUMENTS

| | | | | |
|---|---|---|---|---|
| 6,217,049 B1* | 4/2001 | Becker | | 280/276 |
| 7,357,232 B2* | 4/2008 | Fujita | | 188/297 |
| 7,708,296 B2* | 5/2010 | Becker et al. | | 280/276 |
| 7,740,263 B2 | 6/2010 | Inaguma | | 280/276 |
| 8,196,946 B2* | 6/2012 | Fuse et al. | | 280/276 |
| 2003/0071400 A1* | 4/2003 | Graves et al. | | 267/140.11 |

FOREIGN PATENT DOCUMENTS

| | | |
|---|---|---|
| JP | 07-196063 A | 8/1995 |
| JP | 2008-265534 A | 11/2008 |
| JP | 2009-036223 A | 2/2009 |

* cited by examiner

*Primary Examiner* — Anne Marie Boehler
(74) *Attorney, Agent, or Firm* — Carrier Blackman & Associates, P.C.; Joseph P. Carrier; Michael J. McCandlish

(57) ABSTRACT

A front fork for a saddle-type vehicle includes a front wheel and a pair of left and right leg members disposed on opposite sides of the front wheel. Each of the left and right leg members includes an outer tube having a lower end portion thereof journaling an axle of the front wheel, an inner tube slidably fitted into the outer tube and having an upper portion thereof connected to a head pipe of the vehicle, and a spring installed in a compressed state between the outer and inner tubes. The respective springs of the left and right leg members are set to have different weights from one another. As such, the front fork is configured to correct a weight imbalance between left and right sides of the vehicle body, while increasing freedom in the layout of the vehicle body.

4 Claims, 6 Drawing Sheets

FRONT FORK FOR A SADDLE RIDE VEHICLE, AND VEHICLE INCORPORATING SAME

CROSS-REFERENCE TO RELATED APPLICATIONS

The present invention claims priority under 35 USC 119 based on Japanese patent application No. 2010-110006, filed on May 12, 2010. The entire subject matter of this priority document, including specification claims and drawings thereof, is incorporated by reference herein.

BACKGROUND OF THE INVENTION

1. Field of the Invention

The present invention relates to a front fork for a saddle-type vehicle, and to a vehicle incorporating the same. More particularly, the present invention relates to a front fork for a saddle-type vehicle, having a pair of left and right leg members disposed on respective left and right sides of a front wheel, each leg member including an outer tube having a lower end portion thereof journaling an axle of the front wheel, an inner tube slidably fitted into the outer tube and having an upper portion thereof connected to a head pipe arranged at a front end portion of a vehicle body frame, and a spring installed in a compressed state between the outer tube and the inner tube, and to a vehicle incorporating the same.

2. Description of the Background Art

A number of designs are known for motorcycle front forks. An example of a front fork design is disclosed in Japanese Patent Laid-open No. Hei 7-196063.

According to Japanese Patent Laid-open No. Hei 7-196063, for correcting imbalance in weight between left and right sides of the vehicle, because of a disc brake disposed on either the left or right side of the a front wheel, an inner tube of a leg member, of a pair of left and right leg members of a front fork, on the side opposite to that on which the disc brake is disposed, is formed to have a wall thickness greater than a wall thickness of an inner tube of a leg member on the side on which the disc brake is disposed.

As disclosed in Japanese Patent Laid-open No. Hei 7-196063, however, having different wall thicknesses between the left and right inner tubes results in rigidity of the left and right leg members being different from each other. A solution for achieving a good balance between the left and right sides of the saddle-type vehicle has therefore very often been that an exhaust muffler, a battery, and other heavy components are placed appropriately, with the wall thickness of the left and right inner tubes kept identical. This has posed a problem of restricted layout of the vehicle body.

The present invention has been made in view of the foregoing situation. Accordingly, it is one of the objects of the present invention to provide a front fork for use in a saddle-type vehicle that can correct imbalance in weight between left and right sides occurring from an accessory disposed on at least one crosswise side of a front wheel, or in weight between left and right sides of a vehicle body occurring from a heavy element disposed on the vehicle body, while enhancing the degree of freedom in layout of the vehicle body. The term "saddle ride" may be substituted for the term "saddle-type" throughout this document, and these terms are used interchangeably.

SUMMARY OF THE INVENTION

In order to achieve the above object, a first aspect of the present invention provides a front fork for a saddle-type vehicle, where the front fork includes a pair of left and right leg members disposed on opposite sides of a front wheel in a crosswise direction thereof. Each leg member includes an outer tube having a lower end portion thereof journaling an axle of the front wheel, an inner tube slidably fitted into the outer tube and having an upper portion thereof connected to a head pipe at a front end portion of a vehicle body frame, and a spring installed in a compressed state between the outer tube and the inner tube. The left and right springs are set to have different weights from one another.

The present invention according to a second aspect thereof, in addition to the first aspect, is characterized in that the left and right springs are set to have substantially identical reaction characteristics.

The present invention according to a third aspect thereof, in addition to one of the first and second aspects, is characterized in that the left and right springs are set to have a length different from each other.

The present invention according to a fourth aspect thereof, in addition to the third aspect, is characterized in that one of the left and right leg members further includes a cylindrical spring collar placed between the outer tube or the inner tube and the spring thereof.

The present invention according to a fifth aspect thereof, in addition to one of the first through fourth aspects, is characterized in that the outer tube of one of the leg members having the spring that is lighter in weight is mounted with a disc brake caliper body disposed on either one of the two sides in the crosswise direction of the front wheel.

The present invention according to a sixth aspect thereof provides a front fork for a saddle-type vehicle, including a pair of left and right leg members disposed on either side in a crosswise direction of a front wheel, each leg member including an outer tube having a lower end portion thereof journaling an axle of the front wheel, an inner tube slidably fitted into the outer tube and having an upper portion thereof connected to a head pipe at a front end portion of a vehicle body frame, and a spring installed in a compressed state between the outer tube and the inner tube. According sixth aspect of the present invention, each of left and right leg members includes a cylindrical spring collar placed between the outer tube or the inner tube and the spring; and the spring collars are set to have different weights from one another.

The present invention according to a seventh aspect thereof, in addition to the sixth aspect, is characterized in that the outer tube of one of the left and right leg members having the spring collar that is lighter in weight is mounted with a disc brake caliper body disposed on either one of the two sides in the crosswise direction of the front wheel.

Effects of the Inventive Embodiments

In the first aspect of the present invention, an imbalance in weight between left and right sides of a vehicle body occurring from an accessory disposed on at least one crosswise side of a front wheel, or an imbalance in weight between left and right sides of the vehicle body occurring from a heavy element disposed on the vehicle body can be corrected without allowing rigidity of the left and right leg members included in the front fork to be varied from each other. Moreover, the degree of freedom in layout of the vehicle body can be enhanced.

In the second aspect of the present invention, the springs of the left and right leg members have an identical reaction characteristic. This not only corrects imbalance in weight between the left and right sides, but also achieves a good balance in riding comfort in the crosswise direction.

In the third aspect of the present invention, the springs of the left and right members have a different length from each other, so that weight of two springs can be easily varied.

In the fourth aspect of the present invention, the spring collar is placed between the outer tube or the inner tube and the spring in either one of the two leg members, which allows the length of the spring to be adjusted easily. Moreover, accuracy is not required in manufacturing the spring collar, which achieves reduction in cost.

In the fifth aspect of the present invention, the caliper body of the disc brake is mounted on the outer tube of one of the left and right leg members having the spring lighter in weight. Imbalance in weight between the left and right sides occurring from the disc brake disposed on one side of the front wheel can be corrected by a difference in weight between the left and right springs.

In the sixth aspect of the present invention, imbalance in weight between left and right sides of the vehicle body occurring from an accessory disposed on at least one crosswise side of the front wheel, or in weight between left and right sides of the vehicle body occurring from a heavy element disposed on the vehicle body can be corrected without allowing rigidity of the left and right leg members included in the front fork to be varied from each other. Moreover, the degree of freedom in layout of the vehicle body can be enhanced.

In the seventh aspect of the present invention, the caliper body of the disc brake is mounted on the outer tube of one of the left and right leg members having the spring collar lighter in weight. Imbalance in weight between the left and right sides occurring from the disc brake disposed on one side of the front wheel can be corrected by a difference in weight between the left and right spring collars.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Illustrative embodiments of the present invention will be described below with reference to the accompanying drawings.

A first embodiment of the present invention will be described below with reference to FIGS. 1 through 4.

Figure 1:
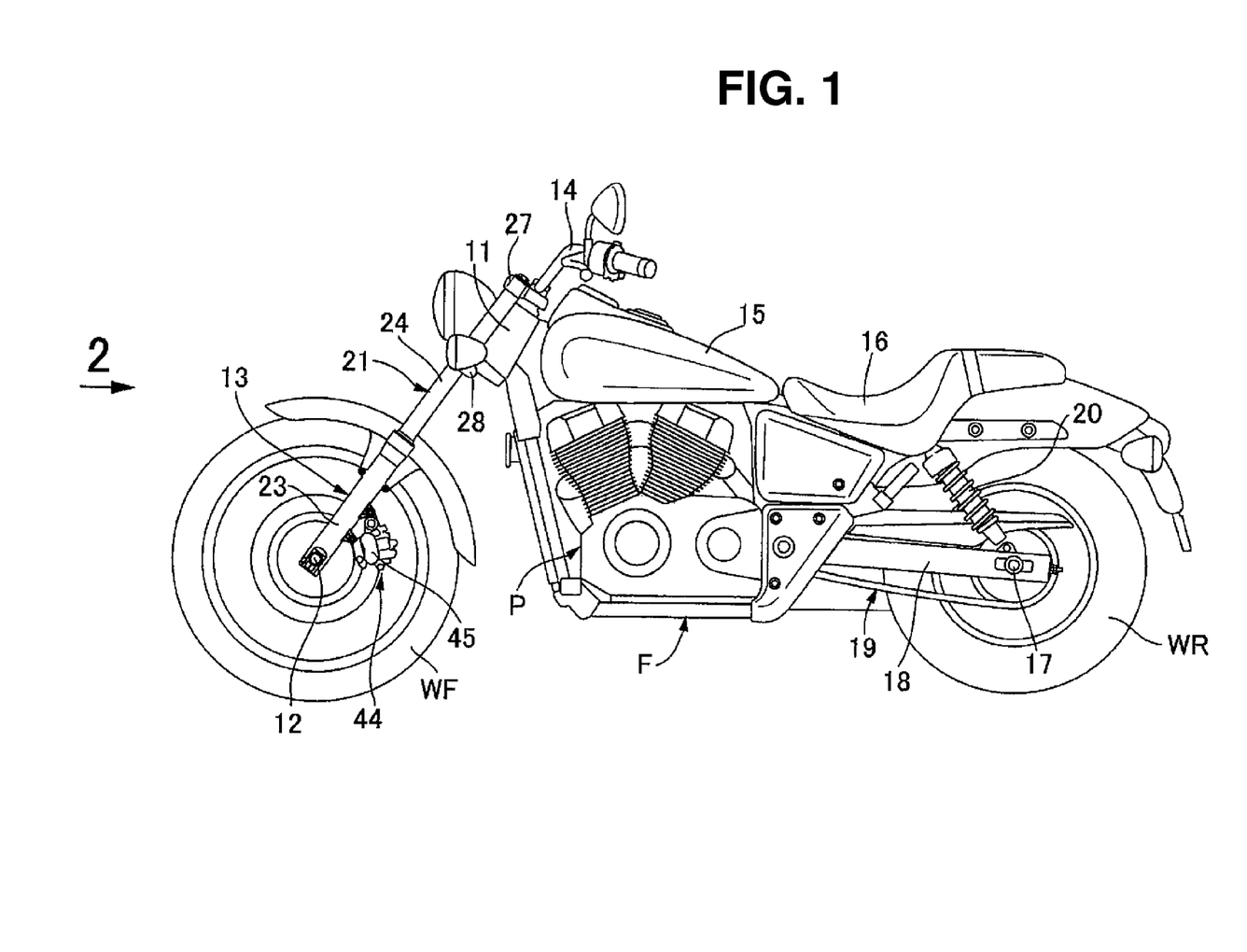
FIG. 1 is a side elevational view showing a motorcycle according to a first illustrative embodiment of the present invention.
Figure 2:
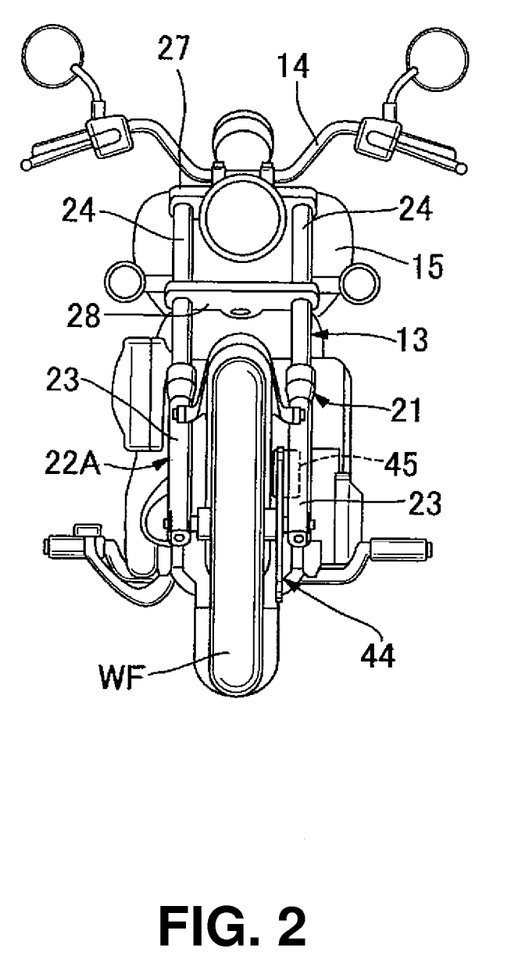
FIG. 2 is a front elevational view seen in a direction of arrow 2 of FIG. 1.

Referring to FIGS. 1 and 2, a motorcycle as a saddle-type vehicle has a vehicle body frame F. The vehicle body frame F includes a head pipe 11 disposed at a front end portion thereof. The head pipe 11 removably and steerably supports a front fork 13 having a lower end portion thereof journaling an axle 12 of a front wheel WF. A bar-like steering handlebar 14 is connected to an upper portion of the front fork 13.

The vehicle body frame F is mounted with a power unit P disposed between the front wheel WF and a rear wheel WR. A fuel tank 15 disposed upwardly of the power unit P, and an occupant seat 16 disposed rearwardly of the fuel tank 15 are supported on the vehicle body frame F.

An axle 17 of the rear wheel WR is journaled at a rear portion of a swing arm 18 supported on the vehicle body frame F in a vertically swingable manner. A chain type transmission unit 19, for transmitting a rotatable driving force from the power unit P to the rear wheel WR, is disposed between the power unit P and the rear wheel WR. A rear shock absorber 20 is disposed between a rear portion of the swing arm 18 and the vehicle body frame F.

The front fork 13 includes a pair of left and right leg members 21, 22A. Each of the leg members 21, 22A is disposed on respective side of the front wheel WF so as to journal the axle 12 of the front wheel WF with a lower end portion thereof.

Figure 3:
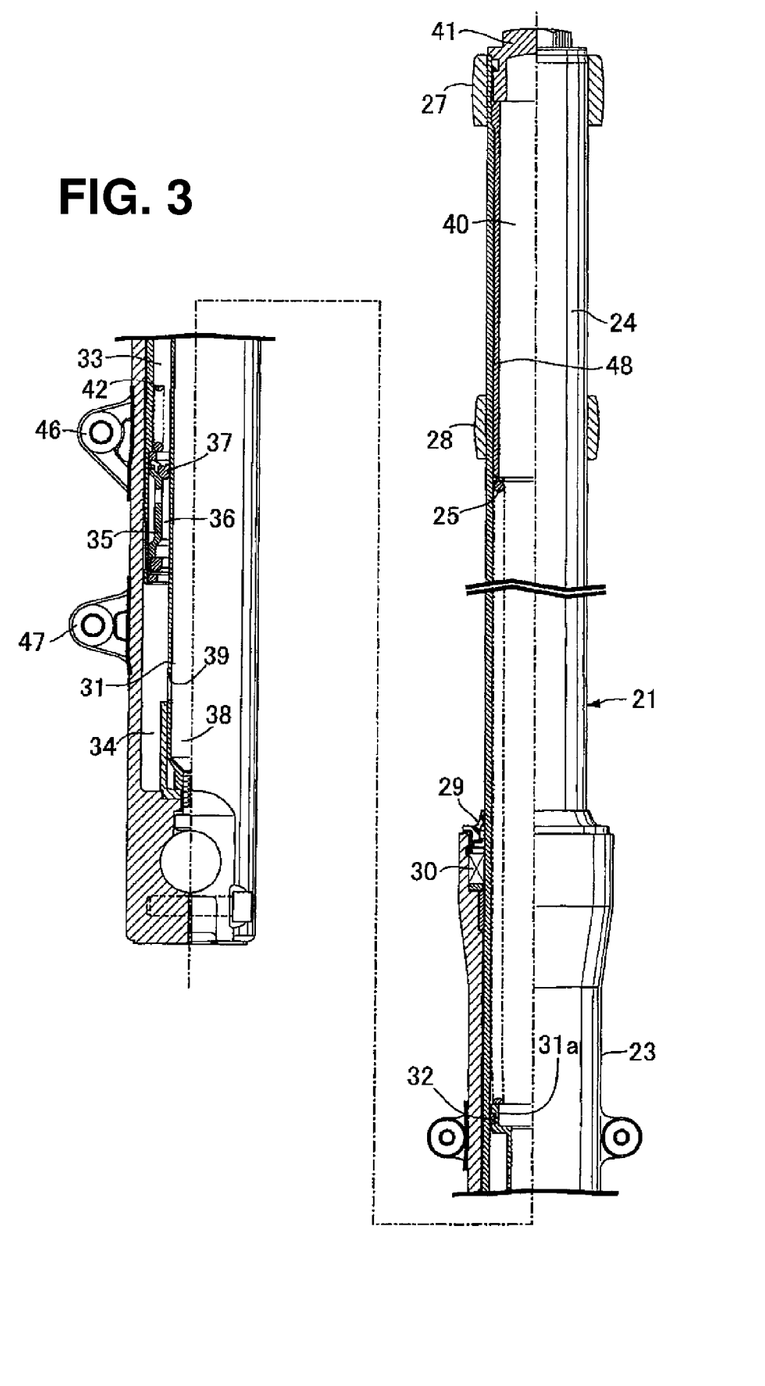
FIG. 3 is a longitudinal side elevational sectional view showing an arrangement of a left leg member of the first illustrative embodiment.

Referring to FIG. 3, the left leg member 21 generally includes an outer tube 23, an inner tube 24, and a spring 25. Specifically, the outer tube 23 has a lower end portion journaling the axle 12 of the front wheel WF. The inner tube 24 is slidably fitted into the outer tube 23 and has an upper portion thereof connected to the head pipe 11 at the front end of the vehicle body frame F. The spring 25 is installed in a compressed state between the outer tube 23 and the inner tube 24.

Figure 4:
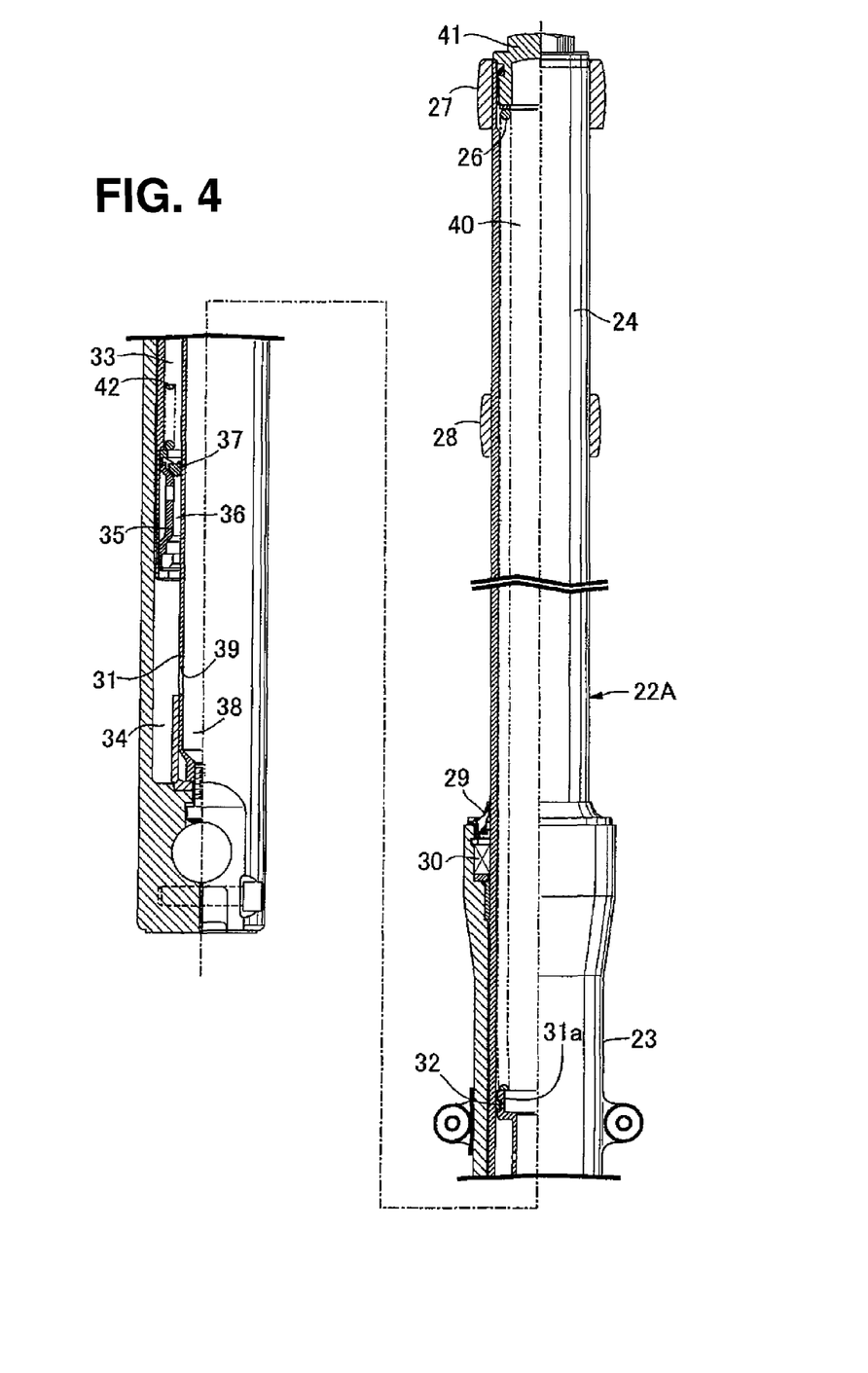
FIG. 4 is a longitudinal side elevational sectional view showing an arrangement of a right leg member of the first illustrative embodiment.

Referring to FIG. 4, the right leg member 22A generally includes an outer tube 23, an inner tube 24, and a spring 26 (also termed as a right leg spring 26). Specifically, the outer tube 23 has a lower end portion journaling the axle 12 of the front wheel WF. The inner tube 24 is slidably fitted into the outer tube 23 and has an upper portion thereof connected to the head pipe 11 at the front end of the vehicle body frame F. The spring 26 is installed in a compressed state between the outer tube 23 and the inner tube 24.

In addition, a top bridge 27 and a bottom bridge 28 are disposed across the inner tube 24 of the left leg member 21 and the inner tube 24 of the right leg member 22A, respectively.

In each of the left and right leg members 21, 22A, the outer tube 23 has an upper end opening portion on which a dust seal 29 and an oil seal 30 that make a sliding contact with an outer periphery of the inner tube 24 are mounted. A cylindrical pipe 31 disposed coaxially in the outer tube 23 is fixed to a lower end portion of the outer tube 23. The pipe 31 includes tubular portion 31a, having increased diameter, disposed at an upper end thereof. A piston ring 32 that makes a sliding contact with an inner periphery of the inner tube 24 is mounted on an outer periphery of the diameter increased tubular portion 31a.

In each of the left and right leg members 21, 22A, a piston 35 is disposed at a lower end portion of the inner tube 24 between an annular upper oil chamber 33 formed between an outer periphery of the pipe 31 and an inner periphery of the inner tube 24, and an annular lower oil chamber 34 formed between the outer periphery of the pipe 31 and an inner periphery of the outer tube 23.

An annular gap 36 communicating with the lower oil chamber 34 is formed between an inner periphery of the piston 35 and the outer periphery of the pipe 31. A check valve 37 is disposed at an upper portion of the piston 35 so as to be disposed between the annular gap 36 and the upper oil chamber 33. In addition, an oil sump chamber 38 is formed in the pipe 31. The pipe 31 has a plurality of oil holes 39 formed at a lower portion thereof, for providing communication between the oil sump chamber 38 and the lower oil chamber 34.

In each of the left and right leg members 21, 22A, a gas chamber 40 communicating with the oil sump chamber 38 is formed at an upper portion inside the inner tube 24. A cap bolt 41 that airtightly closes an upper end opening portion of the gas chamber 40 is threadedly engaged with an upper end portion of the inner tube 24. In addition, a rebound spring 42 is accommodated inside the upper oil chamber 33. The rebound spring 42 has both ends that are to be abutted on the piston 35 and the diameter increased tubular portion 31a.

The spring 25 of the left leg member 21 is set to have a weight different from that set for the spring 26 of the right leg member 22A. It is to be noted here that a disc brake 44 is disposed on at least one crosswise side of the front wheel WF and a caliper body 45 forming part of the disc brake 44 is mounted on the outer tube 23 of, of the left and right leg members 21, 22A, the leg member having a spring lighter in weight than the other.

In the first embodiment of the present invention, the disc brake 44 is disposed on the left side of the front wheel WF, the spring 25 of the left leg member 21 is formed to be lighter in weight than the spring 26 of the right leg member 22A, and the caliper body 45 is mounted on a pair of upper and lower brackets 46, 47 (see FIG. 3) integrally disposed on the outer tube 23 of the left leg member 21. Further, the springs 25, 26 are set to have a length different from each other in order to vary the weight of the two springs 25, 26.

In order to make the spring 25 of the left leg member 21 lighter in weight and shorter in length than the spring 26 of the right leg member 22A, in the left leg member 21, a cylindrical spring collar 48 is placed between the outer tube 23 or the inner tube 24 and the spring 25.

In the first embodiment of the present invention, the spring 25 is disposed between the spring collar 48 accommodated inside the inner tube 24 in abutment with the cap bolt 41 fixedly installed at the upper end of the inner tube 24 and the upper end of the pipe 31 fixedly installed in the outer tube 23. In the right leg member 22A, the spring 26 is disposed in a compressed state between the cap bolt 41 fixedly installed at the upper end of the inner tube 24 and the pipe 31 fixedly installed in the outer tube 23.

While the spring 25 of the left leg member 21 and the spring 26 of the right leg member 22A are set to have a wire diameter, a pitch, a weight, and a length different from each other, the springs 25, 26 have an identical reaction characteristic.

Advantageous effects of the first embodiment will be described below.

The caliper body 45 of the disc brake 44 is mounted on the outer tube 23 of at least either one of the left and right leg members 21, 22A included in the front fork 13, or the left leg member 21 in the first embodiment of the present invention. The left and right springs 25, 26 are set to have different weights from one another and the spring 25 of the left leg member 21 is set to be lighter in weight than the spring 26 of the right leg member 22A.

Imbalance in weight between the left and right sides occurring from the disc brake 44 disposed on one side of the front wheel WF can therefore be corrected by the difference in weight between the left and right springs 25, 26 without allowing rigidity to be varied between the left and right leg members 21, 22A of the front fork 13. Moreover, the degree of freedom in layout of the vehicle body can be enhanced.

The springs 25, 26 of the left and right leg members 21, 22A are set to have an identical reaction characteristic. Balance in riding comfort in the crosswise direction can therefore achieved, while correcting imbalance in weight between the left and right sides.

The springs 25, 26 of the left and right leg members 21, 22A are set to have a length different from each other. By varying the length, the weight of the two springs 25, 26 can be varied easily. In the left leg member 21, the spring collar 48 is placed between the outer tube 23 or the inner tube 24 and the spring 25, so that the length of the spring 25 can be easily adjusted. Moreover, a high level of accuracy is not required in manufacturing the spring collar 48, which allows for a reduction in cost.

Figure 5:
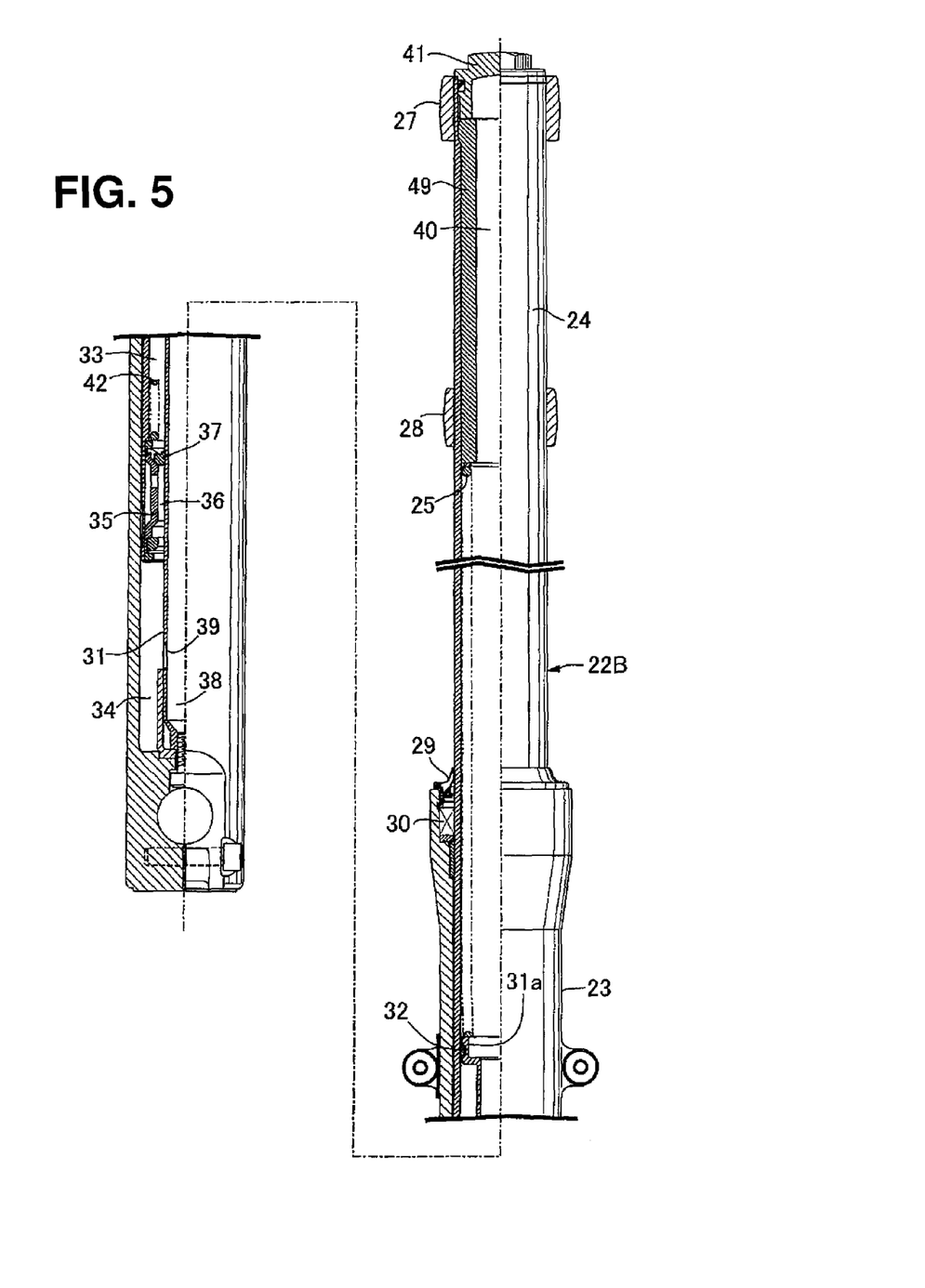
FIG. 5 is a longitudinal side elevational sectional view showing an arrangement of the right leg member according to a second illustrative embodiment of the present invention.

A second embodiment of the present invention will be described below with reference to FIG. 5. Corresponding parts are identified by the same reference numerals as those used for the first embodiment, and detailed descriptions for those parts will be omitted.

A right leg member 22B has a spring 25 that is identical to a spring 25 of a left leg member 21. In the right leg member 22B, a cylindrical spring collar 49 is placed between one of an outer tube 23 and an inner tube 24 and the spring 25. In the second embodiment of the present invention, the spring 25 is disposed between the spring collar 49 accommodated inside the inner tube 24 in abutment with a cap bolt 41 fixedly installed at an upper end of the inner tube 24 and an upper end of a pipe 31 fixedly installed in the outer tube 23.

Moreover, the spring collar 49 of the right leg member 22B is formed to have a wall thickness greater than a spring collar 48 (see FIG. 3 of the first embodiment of the present invention) of a left leg member 21, which results in the spring collar 49 being heavier than the spring collar 48 of the left leg member 21.

In the second embodiment of the present invention, imbalance in weight between the left and right sides occurring from a disc brake 44 disposed on the left side of a front wheel WF can be corrected by a difference in weight between the left and right spring collars 48, 49 without allowing rigidity to be varied between the left and right leg members 21, 22B of the front fork 13. Moreover, the degree of freedom in layout of the vehicle body can be enhanced.

Figure 6:
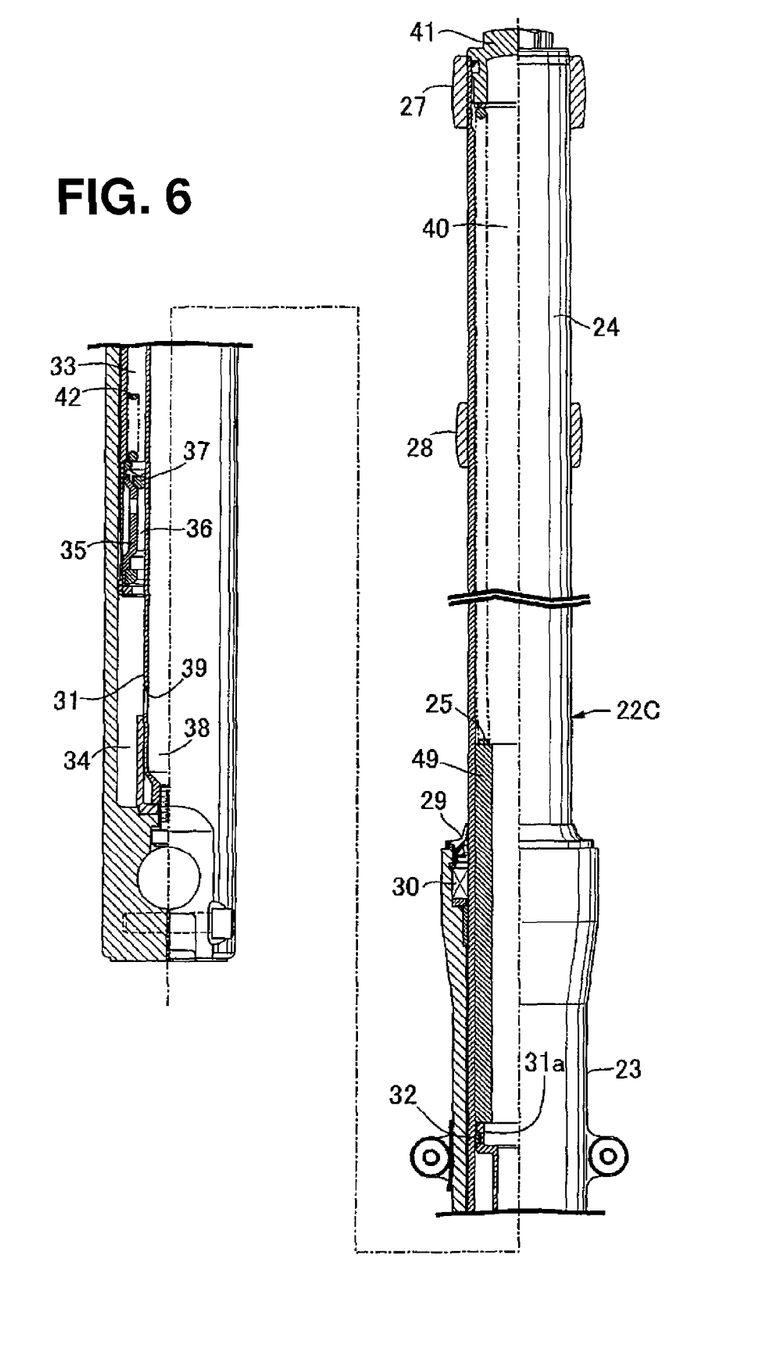
FIG. 6 is a longitudinal side elevational sectional view showing an arrangement of a right leg member according to a third illustrative embodiment of the present invention.

A third embodiment of the present invention will be described below with reference to FIG. 6. Corresponding parts are identified by the same reference numerals as those used for the first and second embodiments, and detailed descriptions for those parts will be omitted.

A right leg member 22C has a spring 25 that is identical to a spring 25 of a left leg member 21. In the right leg member 22C, a cylindrical spring collar 49 is placed between one of an outer tube 23 and an inner tube 24 and the spring 25. In the third embodiment of the present invention, the spring 25 is disposed between a cap bolt 41 fixedly installed at an upper end of the inner tube 24 and the spring collar 49 accommodated inside the outer tube 23 in abutment with an upper end of a pipe 31 fixedly installed in the outer tube 23. The spring collar 49 of the right leg member 22C is formed to be heavier than a spring collar 48 of the left leg member 21.

The same effects as those of the second embodiment of the present invention can be achieved also from the third embodiment of the present invention.

It should be understood that the present invention is not limited to the disclosed embodiments, but also encompasses various changes falling within the spirit and scope of the appended claims.

Specifically, in the embodiments of the present invention described above, the imbalance in weight between the left and right sides occurring from the disc brake 44 disposed on either one of the two sides of the front wheel WF. The present invention may still be applied to correct imbalance in weight between the left and right sides of the vehicle body occurring from disposition of a heavy part, for example, an exhaust muffler and a battery. The present invention may further be applied to a motorcycle of a double disc type in which disc brakes are disposed on both sides of the front wheel WF.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A front fork for a saddle ride vehicle having a vehicle body frame, a head pipe attached to the vehicle body frame, and a front wheel,
   said front fork comprising a pair of left and right leg members respectively disposed on left and right sides of the front wheel, each of the left and right leg members comprising:
   an outer tube having a lower end portion thereof journaling an axle of the front wheel; and
   an inner tube slidably fitted into the outer tube and having an upper portion thereof connected to the head pipe arranged at a front end portion of the vehicle body frame; and
   a cap bolt threadedly engaged with an upper end portion of the upper portion;
   wherein:
   the left leg member further comprises:
      a cylindrical collar accommodated inside the left inner tube in abutment with the left cap bolt;
      a left spring installed in a compressed state between the cylindrical collar and the left outer tube;
   the right leg member further comprises:
      a right spring installed in a compressed state between the right cap bolt and right outer tube, the right spring being longer than the left spring;
   the left and right springs have substantially the same reaction characteristic; and
   the left and right springs are set to have different weights from one another, said springs configured such that an imbalance in weight between the left and right sides of the vehicle is improved by the difference in weight between the left and right springs.

2. The front fork for the saddle ride vehicle according to claim 1, wherein each of the left and right leg members further comprises:
   a cylindrical pipe disposed coaxially in the outer tube and fixed to a lower end portion of the outer tube, the cylindrical pipe including a tubular portion having increased diameter disposed at an upper end thereof, and having a plurality of oil holes formed at a lower portion thereof;
   a piston ring that makes a sliding contact with an inner periphery of the inner tube, the piston ring being mounted on an outer periphery of the increased diameter tubular portion;
   a piston disposed at a lower end portion of the inner tube between an annular upper oil chamber formed between an outer periphery of the cylindrical pipe and an inner periphery of the inner tube;
   an annular lower oil chamber formed between the outer periphery of the pipe and an inner periphery of the outer tube;
   an annular gap communicating with the lower oil chamber, the annular gap formed between an inner periphery of the piston and the outer periphery of the cylindrical pipe;
   an oil sump chamber, the oil sump chamber being formed in the cylindrical pipe, the oil holes formed in the lower portion of the cylindrical pipe providing communication between the oil sump chamber and the lower oil chamber;
   a gas chamber formed in an upper portion of the inner tube, and in communication with the oil sump chamber; and
   a rebound spring accommodated inside the upper oil chamber, the rebound spring having a first end abutted to the piston and the second end abutted to the diameter increased tubular portion.

3. The front fork for the saddle ride vehicle according to claim 1, wherein the left and right springs are set to have a wire diameter and a pitch different from each other.

4. The front fork for the saddle ride vehicle according to claim 1, wherein the left leg member is mounted with a disc brake caliper body disposed on the side of the front wheel in the left crosswise direction.

* * * * *